US012579285B2

(12) United States Patent
Jain et al.

(10) Patent No.: US 12,579,285 B2
(45) Date of Patent: Mar. 17, 2026

(54) CENTRAL DATA GOVERNANCE AND ACCESS CONTROL FOR ENTERPRISE DATA

(71) Applicant: RAKUTEN SYMPHONY, INC., Tokyo (JP)

(72) Inventors: Gaurav Jain, San Mateo, CA (US); Parth Anand, Indore (IN); Ayush Goyal, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 203 days.

(21) Appl. No.: 18/260,321

(22) PCT Filed: Apr. 17, 2023

(86) PCT No.: PCT/US2023/018773
§ 371 (c)(1),
(2) Date: Jul. 4, 2023

(87) PCT Pub. No.: WO2024/220066
PCT Pub. Date: Oct. 24, 2024

(65) Prior Publication Data
US 2025/0045424 A1 Feb. 6, 2025

(51) Int. Cl.
*G06F 21/60* (2013.01)
*G06F 21/62* (2013.01)

(52) U.S. Cl.
CPC ........ *G06F 21/604* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 10,795,991 B1 * | 10/2020 | Ross | G06F 16/90 |
| 2005/0236474 A1 | 10/2005 | Onuma et al. | |
| 2006/0248045 A1 * | 11/2006 | Toledano | G06F 16/258 |
| 2015/0350222 A1 * | 12/2015 | Hashimoto | H04L 63/102 726/3 |
| 2019/0197532 A1 * | 6/2019 | Jayachandran | G06Q 20/401 |
| 2022/0035933 A1 * | 2/2022 | Qiao | G06F 16/168 |

* cited by examiner

*Primary Examiner* — Sanchit K Sarker
(74) *Attorney, Agent, or Firm* — HAUPTMAN HAM, LLP

(57) ABSTRACT

A data platform provides central data governance and access control for enterprise data. Information identifying data of interest at a storage system is received from users. An Access Request for the data of interest at the storage system is generated. The Access Request is forward to a Data Access Layer of a Data Governance and access Control Layer. An Approval Request is automatically forwarded by the Data Access Layer to one or more access control entities. The Data Access Layer receives an Approval Response from the one or more access control entities. A policy for accessing the data of interest at the storage system is created. The policy is used to provide access to the data of interest at the storage system. The Data Access Layer is also able to provide cross-platform access to different storage sources.

20 Claims, 6 Drawing Sheets

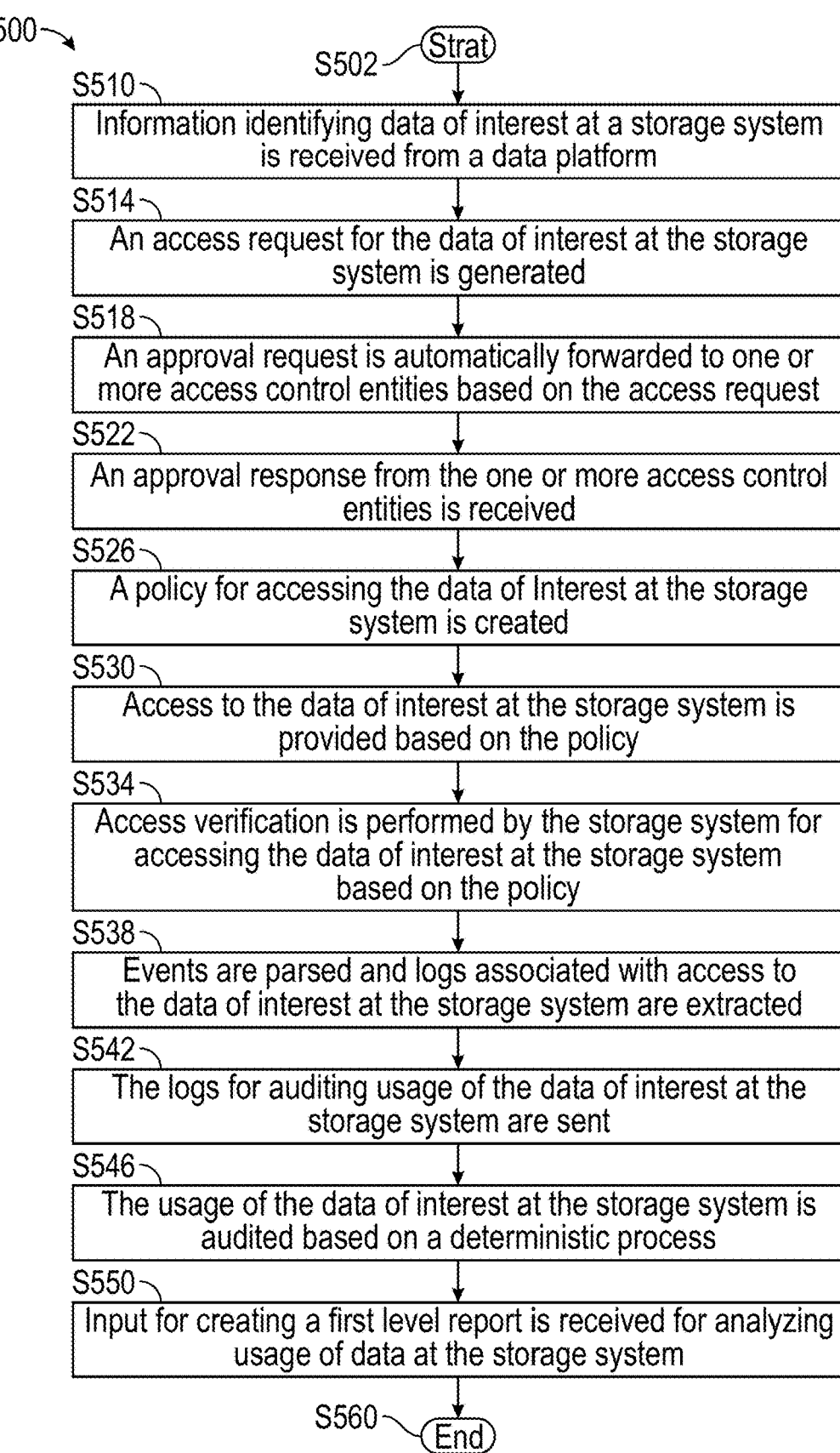

500

S502 — Start

S510 —
Information identifying data of interest at a storage system is received from a data platform S514 —
An access request for the data of interest at the storage system is generated S518 —
An approval request is automatically forwarded to one or more access control entities based on the access request S522 —
An approval response from the one or more access control entities is received S526 —
A policy for accessing the data of Interest at the storage system is created S530 —
Access to the data of interest at the storage system is provided based on the policy S534 —
Access verification is performed by the storage system for accessing the data of interest at the storage system based on the policy S538 —
Events are parsed and logs associated with access to the data of interest at the storage system are extracted S542 —
The logs for auditing usage of the data of interest at the storage system are sent S546 —
The usage of the data of interest at the storage system is audited based on a deterministic process S550 —
Input for creating a first level report is received for analyzing usage of data at the storage system S560 — End

FIG. 5

CENTRAL DATA GOVERNANCE AND ACCESS CONTROL FOR ENTERPRISE DATA

RELATED APPLICATIONS

The present application is a National Phase of International Application No. PCT/US2023/018773, filed Apr. 17, 2023.

TECHNICAL FIELD

This description relates to central data governance and access control for enterprise data, and method of using the same.

BACKGROUND

In an organization, there are many teams that generate data. There are numerous components or products, such as Apache Ranger, that enable, monitor and manage data security across the Hadoop platform. Similar products include Atlan and Datahub.

To be able to take advantage of this data, a user has to be granted access to the data. Data access management, or data access governance, provides secure collaboration, visibility, and control of access to files and information. Data access governance is implemented throughout an organization, including business users and Information Technology (IT) teams. Data access governance involves maintaining data security, protecting Personal Identifiable Information (PII), providing access to data assets, managing permissions, and many other data security functions. Data access control systems enable companies to secure confidential information, define ownership of data, and implement managed access controls.

However, existing systems present problems for governing data access. For example, such systems are tightly coupled with the data platform and thus do not scale to new data platforms that are able to be implemented. Existing systems also present compatibility issues with different data platforms and use complex data access processes that users cumbersome to use to obtain access rights. Existing access control layers provide functionalities within an eco-system, such as AWS or Azure, but do not provide a unified layer. Users often request permission from data owners to obtain access, but identifying who the data owner is, how to contact the data owner, and other issues make the process difficult.

SUMMARY

In at least embodiment, a method for providing central data governance and access control for enterprise data includes receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

In at least one embodiment, a data platform includes a memory storing computer-readable instructions, and a processor connected to the memory, wherein the processor is configured to execute the computer-readable instructions to perform operations to receive information identifying data of interest at a storage system, generate an Access Request for the data of interest at the storage system, automatically forward an Approval Request to one or more access control entities based on the Access Request, receive an Approval Response from the one or more access control entities, create a policy for accessing the data of interest at the storage system, and provide access to the data of interest at the storage system based on the policy.

In at least one embodiment, a non-transitory computer-readable media having computer-readable instructions stored thereon, which when executed by a processor causes the processor to perform operations including receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 5 is a flowchart of a method for providing central data governance and access control for enterprise data according to at least one embodiment.

DETAILED DESCRIPTION

Figure 1:
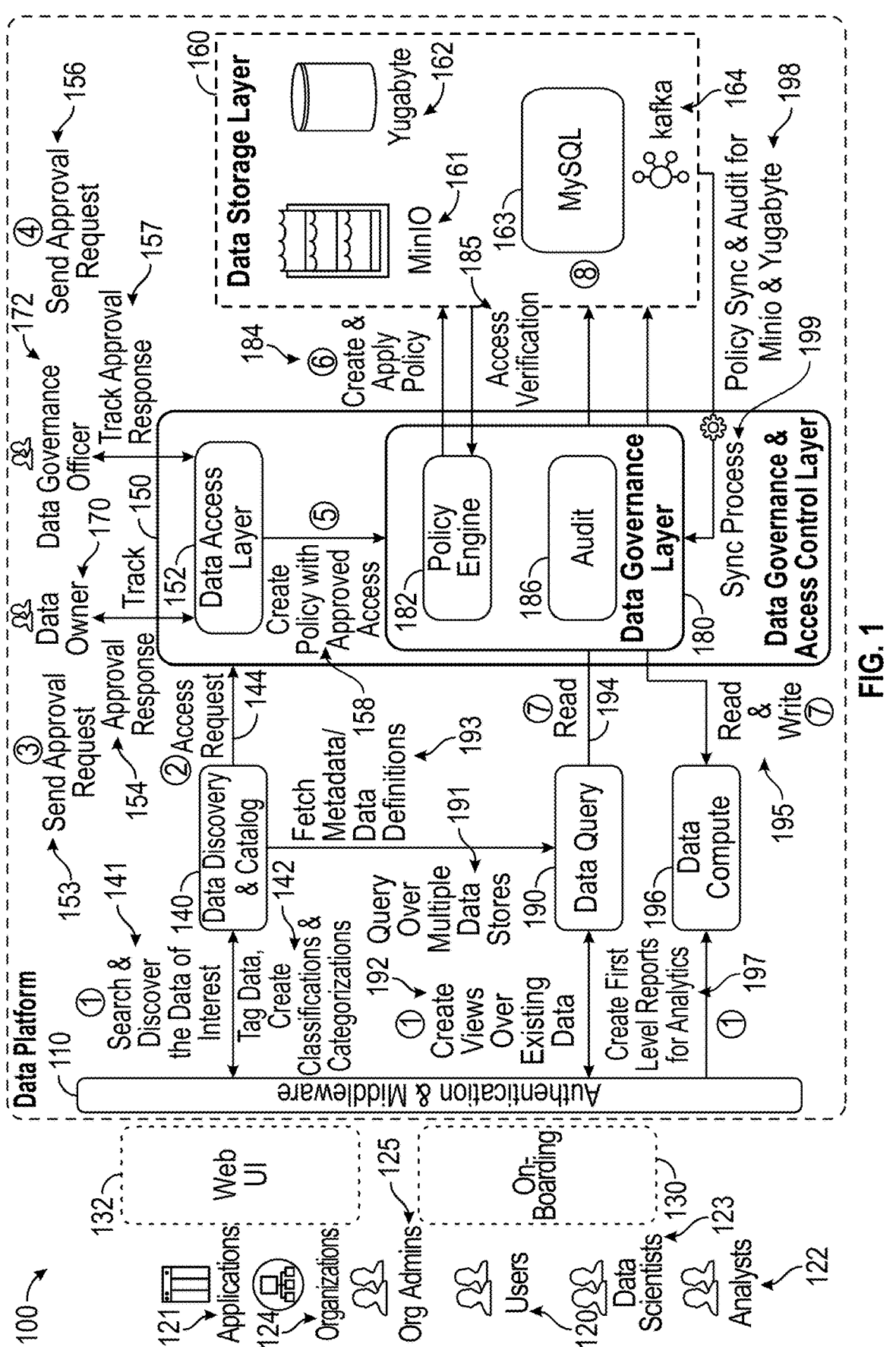
FIG. 1 is a diagram of a Data Discovery Platform according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or any data-streaming or signaling-streaming from UE.

In at least embodiment, a method for providing central data governance and access control for enterprise data includes receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

According to at least one embodiment, Data Platform includes a Data Discovery and Catalog Interface, a Data Governance and Access Control Layer, and a Data Storage Layer. Data Governance and Access Control Layer includes a Data Access Layer and a Data Governance Layer. Data Governance Layer includes a Policy Engine and an Audit Interface. Data Storage Layer is able to support different storage technologies, such as MinIO, Yugabyte, MySQL, and Kafka. Plugins are able to be added to Data Governance and Access Control Layer to support different storage technologies.

Data Platform also implements a Data Query Interface and a Data Compute Interface. Information identifying data of interest at a storage system is received by the Data Discovery and Catalog Interface, where an Access Request for the data of interest at the storage system is generated. Data Access Layer automatically forwards an Approval Request to one or more access control entities based on the Access Request, and receives an Approval Response from the one or more access control entities. Policy Engine create a policy for accessing the data of interest at the storage system based on the Approval Response, and Data Storage Layer provide access to the data of interest at the storage system based on the policy. Data Governance Layer provide access verification for accessing the data of interest at the storage system based on the policy.

Data Query Interface receives input for querying the Data Storage Layer, generates a Query, forms a search input for metadata and data definitions from Data Discovery Catalog to identify a dataset based on the input, and generates a Query Request to access the dataset at the storage system in response to the metadata and data definitions. Access rights are determined at the Policy Engine based on policies, and data access at the storage system is granted according to the determined access rights. Input is received at the Data Compute Interface for creating a first level report for analyzing usage of data at the storage system. Data Storage Layer parses events and extracts logs associated with access to the data at the storage system, send the logs to the Audit Interface for auditing usage of the data based on a deterministic process.

Embodiments described herein provide a method that provides one or more advantages. For example, a method providing central data governance and access control for enterprise data provides a One-Stop solution for data governance and access related services. Time and effort is reduced for the end users because users do not have to create a ticket to get the access to particular data, and do not have to identify the data owner or data governance office for the particular data. Communication with the data owners and the data governance officers is handled automatically. Reliability and control are also provided through the centralized and optimized auditing.

FIG. 1 illustrates a Data Discovery Platform 100 according to at least one embodiment.

In FIG. 1, Data Discovery Platform 100 includes an Authentication and Middleware Interface 110. Information for identifying data of interest is provided to Data Discovery Platform 100 by one or more sources, such as Users 120, Applications 121, Analysts 122, Data Scientist 123, Organizations 124, Administrators 125, etc. Information for identifying data of interest are provided to an Onboarding Interface 130, a Web User Interface (UI) 132, or other Access Interface. Authentication and Middleware Interface 110 provides a centralized interface to control access across different platform, such as AWS, Kubernetes, VMs, etc., and through which end users request access to data and for data owners to manage the access request.

A Data Discovery and Catalog Interface 140 enables a user to Search and Discover Data of Interest 141 in the Data Discovery Platform 100. A user is also able to Tag Data, Create Classifications and Categorizations 142 via Data Discovery and Catalog 140. Whenever the user finds data of interest, the Data Discovery and Catalog Interface 140 generates an Access Request 144 that is provided to Data Access Layer 152 of Data Governance and Access Control Layer 150. Data Governance and Access Control Layer 150 provides control for access to Data Storage Layer 160.

The Access Request 144 is able to include granular details, such as a List of Columns, Masking Details for Personal Identifiable Information (PII), Duration of the Request, Reasons for the Request, etc. Data Governance and Access Control Layer 150 is not tightly coupled with any particular storage platform, but is heavily integrated into the Data Discovery Platform 100.

Data Governance and Access Control Layer 150 provides access control and auditing for MiniIO 161 and Yugabyte 162, as well as other storage technologies, such as MySQL 163, and Kafka 164. Data is highly available with Authentication, Authorization, and Accounting (AAA) deployment. For example, Apache Ranger is able to make data available with shared state on stretched Yugabyte cluster 162 on Kubernetes.

Data Discovery and Catalog Interface 140 provides the Access Request 144 to Data Access Layer 152 of Data Governance and Access Control Layer 150, where an Approval Request 153 is sent to a Data Owner 170 and a Data Governance Officer 172. Those skilled in the art understand that these are provided as examples and that other Data Approval Entities are able to be set up for granting approval to Approval Requests 153. The forwarding of the Approval Request 153 to a Data Approval Entities is able to be setup for automatic provisioning to the Data Approval Entities. For example, the Approval Request 153 is able to be provided to a Data Owner 170 via a communication channel, such as email. Once Data Access Layer 152 receives an Approval Response 154 from the Data Owner 170, Data Access Layer 152 sends an Approval Request 156 to Data Governance Officer 172 for a second level of approval. Data Access Layer 152 waits on Approval Response 157 from Data Governance Officer 172

Data Governance and Access Control Layer 150 enables Data Owners 170 or Data Governance Officers 172 to govern the data, including determining who can access the particular type of data for reads or writes, setting a time period for access, enabling access to the data or to particular columns based on predetermined restrictions, etc. Data Governance and Access Control Layer 150 also allows Data Owners 170 or Data Governance Officers 172 to edit or delete permissions.

Data Governance and Access Control Layer 150 tracks Approval Requests 153 sent to Data Owners 170 and Approval Responses 154 received from the Data Owners 170. Approval Requests 156 sent to Data Governance Officers 172 and Approval Responses 157 received from the Data Governance Officers 172 are also able to be tracked. Thus, users do not have to create a ticket to get the access to particular data, and do not have to find out who the Data Owner 170 or Data Governance Office 172 is for the particular data. The Data Governance and Access Control Layer 150 automatically handles communication with the Data Owners 170 and the Data Governance Officers 172.

The Data Access Layer 152 receives an Approval Response from the Data Governance Officers 172. After the Approval Responses 154, 157 are received at the Data Access Layer 152, the Final Approval Response 158 is sent to the Policy Engine 180 at the Data Governance Layer 180 where a Policy 184 is created and applied for accessing the requested data at the Data Storage Layer 160. Access to the requested data is then provided to the user according to the Policy 184.

Data Governance and Access Control Layer 150 is not limited to a few components, such as Hadoop Distributed File System (HDFS) and Edgebase. Data Governance and Access Control Layer 150 enables new technologies to be integrated by adding a plugin to the Data Governance and Access Control Layer 150 for the new technology. Further, Data Governance and Access Control Layer 150 provides a simple process that is less time consuming for the user to obtain access to data at Data Storage Layer 160.

Approval Responses 154 from Data Owner 170 and Approval Responses 157 from Data Governance Officer 172 are returned to Data Access Layer 152. Data Access Layer 152 creates Policies 184 with the Approved Access 158. Policy Engine 182 creates and applies Policy 184 to Data Storage Layer 160.

Data images are maintained by Data Storage Layer 160. For example, Data Storage Layer 160 is able to maintain data using, for example, MinIO 161, Yugabyte 162, MySQL 163, Apache Kafka 164, etc. MinIO 161 is a cloud compatible object storage. Yugabyte 162 is a distributed SQL database for cloud-native applications. MySQL 163 is an open-source relational database management system. Apache Kafka 164 is a distributed event store and stream-processing platform.

The Policy Engine 182 is configured according to the particular database and the type of data. For example, a new Policy 184 is able to be created for MinIO 161 or Yugabyte 162. The Data Storage Layer 160 communicates with Policy Engine 182 to perform Access Verification 185. Audit Interface 186 of Data Governance Layer 180 is provided to track what the user is doing with the data by obtaining logs or actions the user performs on particular data. Thus, a user uses Data Discovery Platform 100 to search for a catalog for data that is useful for the user's purpose and to obtain approval for access for data satisfying the Access Request 144. The Policy 184 created based on the Approval Responses 153, 157 is then used to create Policy 184 that is applied to the relevant data sources at Data Storage Layer 160.

A user is also able to provide input to generate Queries 191 at Data Query Interface 190. Through Queries 191, a user is able to create Views Over Existing Data 192 in Data Storage Layer 160. Queries 191 are also able to be provided for searching over multiple data stores in Data Storage Layer 160. Data Query Interface 190 forms a search input for Metadata and Data Definitions 193 from Data Discovery and Catalog Interface 140 to identify a dataset. Using the Metadata and Data Definitions 193, Data Query Interface 190 sends a read or write Access Request 194 to Policy Engine 182.

Policy Engine 182 checks access rights. In response to Policy Engine 182 already having an approved Policy 184 related to the Access Request, the Access Request 194 is sent to the Data Storage Layer 160, The Data Storage Layer 160 is able to perform Access Verification 185 for the Access Request 194. Once the access rights are verified, the Data Storage Layer 160 returns the Response 195.

Data Compute Interface 196 receives input for creating a First Level Reports for Analytics 197. After data access is given, a user is able to generate query input for accessing data, either using the query layer or from any user defined processes. Data Storage Layer 160 provides Policy Sync and Audit 198 from Data Storage Layer 160 to Data Governance and Access Control Layer 150. Read/Write Access Requests 144 are verified against a Policy 184 created for the user. Data Governance and Access Control Layer 150 provides a Sync Process 199 to Data Governance Layer 180 so that Policies 184 are kept updated.

Thus, Data Discovery Platform 100 provides a solution for data governance and access related services, reduces time and effort for the end users, and provides reliability and control due to the centralized and optimized auditing. Current systems present limitations in providing data governance and access control for enterprise data. For example, existing products, such as Apache Ranger, Atlan, Datahub, etc. provide a framework to enable, monitor and manage data security across the Hadoop platform. However, with such systems, data governance is tightly coupled with the particular data platform. Further, the data access process to raise and manage data access requests for data users and owners is complex.

A ticketing service or manual intervention is used to request access which is then processed manually by the Data Owner 170 and Data Governance Officer 172 for the services outside of the Data Storage Layer 160. The ability to provide data access and governance does not enable access control outside of the proprietary system. Apache Ranger also does not provide access control and auditing over MinIO and Yugabyte. Apache Ranger is also not Kubernetes compatible.

Figure 2:
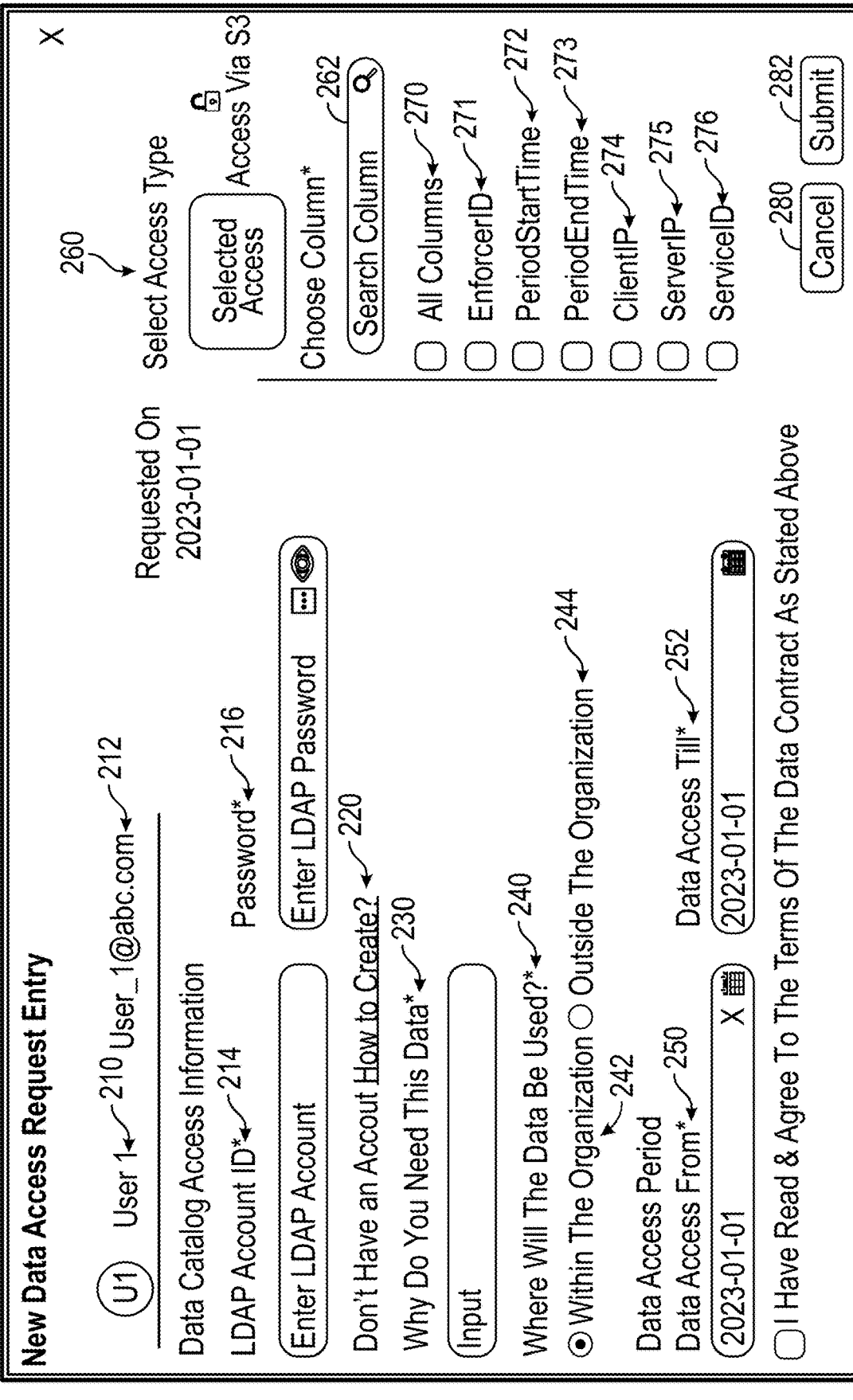
FIG. 2 is a New Data Access Request Entry Interface according to at least one embodiment.

FIG. 2 is a New Data Access Request Entry Interface 200 according to at least one embodiment.

In FIG. 2, User 210 and User Contact 212 are provided. The User 210 is able to provide an LDAP (Lightweight Directory Access Protocol) Account ID 214 and LDAP Password 216. Having an LDAP account is a prerequisite for being able to request access. In response to the User 210 not having an LDAP Account ID 214, the User 210 is able to Create a new LDAP Account 220. The User 210 enters information to identify Why the User Needs The Data 230. The User 210 identifies Where the Data Will Be Used 240. The User 210 is able to select whether the data is going to be use Within The Organization 242 or Outside the Organization 244.

Next, the User 210 enters a Data Access From Date 250 and a Data Access Till Date 252. The User enters information for Select Access Type 260. A Search Column Window 262 is provided to identify columns of data, such as All Columns 270, EnforcerID 271, PersiodStartTime 272, PeriodEndTime 273, ClientIP 274, ServerIP 275, and ServiceID 276. The User 210 is able to select Cancel 280 or Submit 282.

Figure 3:
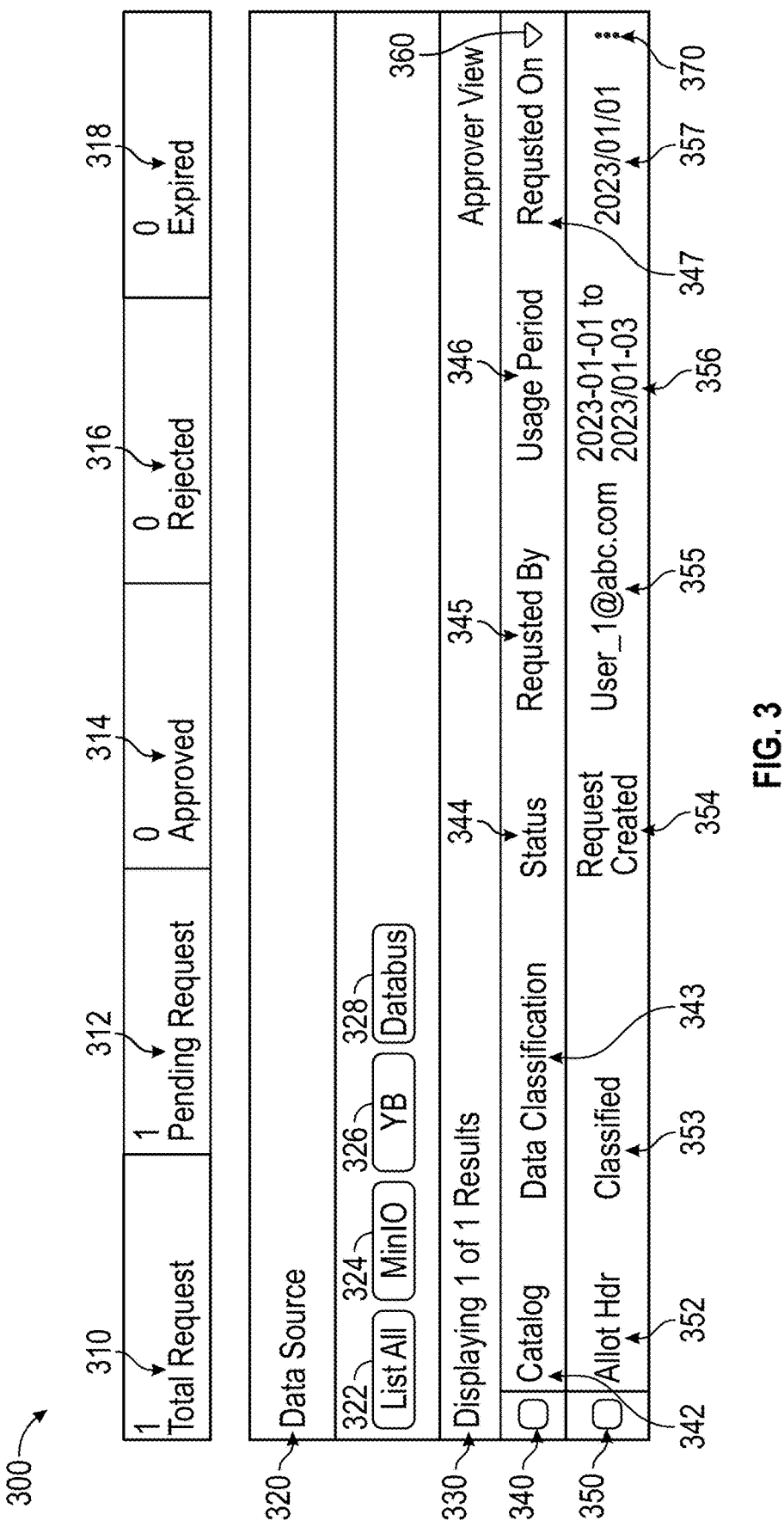
FIG. 3 is a diagram of a display of the New Data Access Request according to at least one embodiment.

FIG. 3 illustrates a display of the New Data Access Request 300 according to at least one embodiment.

In FIG. 3, information is displayed for Total Requests 310, Pending Requests 312, Approved Requests 314, Rejected Requests 316, and Expired Requests 318. Total Requests 310 is shown as being "1". Pending Requests 312 is shown as being "1". Approved Requests 314 is shown as being "0". Rejected Requests 316 is shown as being "0". Expired Requests 318 is shown as being "0".

The Data Source 320 includes selections for List All 322, MinIO 324, Yugabyte (YB) 326, and Databus 328. MinIO 324 selection is for selecting a cloud compatible object storage. Yugabyte 326 selection is for selecting a distributed SQL database for cloud-native applications. Databus 328 selection is for selecting stream data that is able to be pushed by any application. However, those skilled in the art recognize that other data sources are capable of being used without departing from embodiments described herein.

In FIG. 3, New Data Access Request 300 includes an identification of Displaying 1 of 1 Results 330. The Results 330 includes information in columns that are identified with different headers. FIG. 3 shows a row of headers 340 for Catalog 342, Data Classification 343, Status 344, Requested By 345, Usage Period 346, and Requested On Date 347. However, those skilled in the art recognize that other columns and headers are capable of being used without departing from embodiments described herein.

In FIG. 3, a row 350 is display in the Results 330. A header Catalog 342 is identified as Allot HDR 352, Data Classification 343 is identified as Classified 353, Status 344 is identified as Request Created 354, Requested By 345 is identified as User_1@abc.com 355, Usage Period 346 is identified as Jan. 1, 2023 to Jan. 3, 2023 356, and Requested On Date 347 is identified as Jan. 1, 2023 357.

The user is also able to select a drop down menu using Dropdown Menu selector (Caret) 360. Drop Down Menu selector 360 indicates a dropdown menu is able to be displayed. Selection of Down Menu selector 360 opens a dropdown menu option when selected, wherein the dropdown menu is able to display a panel of additional selections that a user is able to further select actions to take. Additional actions are able to be selected using Kebob selector (three vertical dots) 370. Kebob selector 370 opens a smaller inline menu with additional options.

Figure 4:
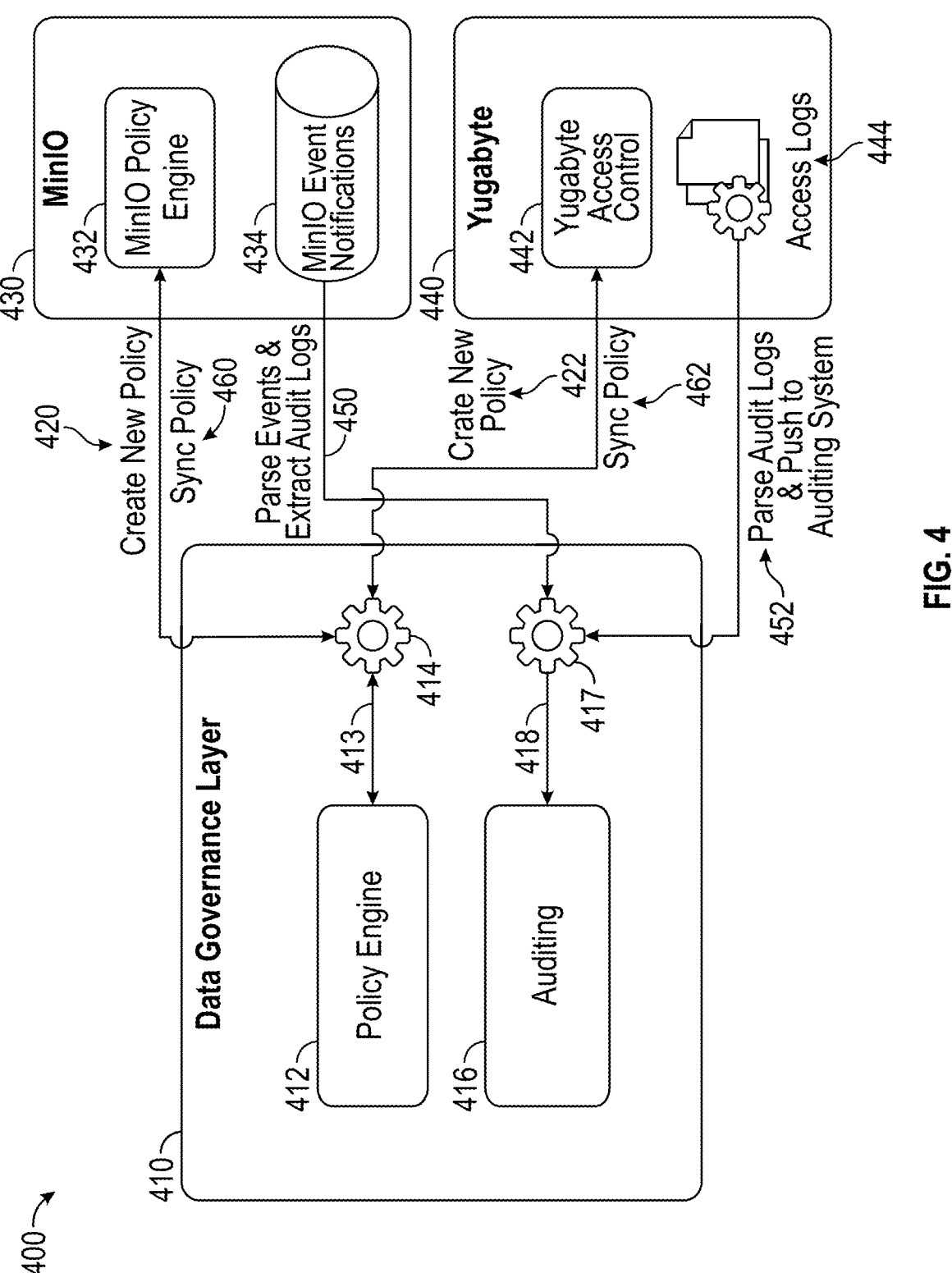
FIG. 4 is a diagram of a system for providing policy synchronization according to at least one embodiment.

FIG. 4 shows a system 400 for providing policy synchronization according to at least one embodiment.

In FIG. 4, Data Governance Layer 410 provides the functionality to create a policy for any number of data lakes or databases. Data Governance Layer 410 includes Policy Engine 412 and Auditing Interface 416. Policy Engine 412 is able to create New Policies 420, 422 according to the database and the type of data. For example, New Policy 420 is able to be created for MinIO 430 or New Policy 422 is able to be created for Yugabyte 440. However, functionality is able to be extended for systems other than MinIO 430 and Yugabyte 440 to enable cross-platform access controls. New Policies 420, 422 are created according to the database and data. Policy Engine 412 sends Policy Details 413 to Backend Process 414 where New Policy 420 is created by converting Policy Details 413 to, for example, MinIO 430 type, or New Policy 422 is created by converting Policy Details 413 to, for example, Yugabyte 430 type.

Policy Engine 412 and Auditing Interface 416 keep the policies synchronized with the centralized Data Governance Layer 410. As shown in FIG. 4, a New MinIO Policy 430 is sent to MinIO Policy Engine 432 of MinIO system 430. A New Yugabyte Policy 422 is sent to Yugabyte Access Control 442 of Yugabyte system 440.

MinIO Policy Engine 432 applies the New MinIO Policy 420 and Yugabyte Access Control 442 applies the New Yugabyte Policy 422. MinIO Event Notifications 434 of MinIO system 430 parses events and extracts MinIO Audit Events and Logs 450. MinIO Audit Events and Logs 450 are sent to Auditing Interface 416 at the Data Governance Layer 410. Yugabyte Access Logs 444 parses Yugabyte Audit Logs 452. Yugabyte Audit Logs 452 are sent to Auditing Interface 416 at the Data Governance Layer 410.

For parsing MinIO Events 450 or Yugabyte Audit logs 452 at scale, Data Governance Layer 410 executes Backend Spark Jobs 417 that reads and parses the MinIO Events 450 or Yugabyte Audit logs 452 and loads 418 the Relevant Access Audit Details 418 to Auditing Interface 416. Sync Policy 460 and Sync Policy 462 are used to synchronize MinIO Audit Events and Logs 450 and Yugabyte Audit logs 452, respectively. Data Governance Layer enables plugins to be used to extend the Data Governance Layer 410 to other databases with enterprise security.

Auditing Interface 416 uses a deterministic approach to provide audit feedback. A deterministic approach identifies results based on a cause and the results do not vary unless the cause is modified. As shown in FIG. 4, different types of databases 430, 440 and different types of access logs 450, 452 are able to be provided. The deterministic approach provided by Auditing Interface 416 simplifies processing of access logs 450, 452, and how the user tracks the different databases 430, 440. While Auditing Interface 416 is described as using a deterministic approach, embodiments described here are able to be implemented in other ways, such as applying artificial intelligence (AI) and machine learning (ML) to generate audit results.

FIG. 5 is a flowchart 500 of a method for providing central data governance and access control for enterprise data according to at least one embodiment.

In FIG. 5, the process starts S502 and information identifying data of interest at a storage system is received from a data platform S510. Referring to FIG. 1, information for identifying data of interest is provided to Data Discovery Platform 100 by one or more sources, such as Users 120, Applications 121, Analysts 122, Data Scientist 123, Organizations 124, Administrators 125, etc. Information for identifying data of interest are provided to an Onboarding Interface 130, a Web User Interface (UI) 132, or other Access Interface. Authentication and Middleware Interface 110 provides a centralized interface to control access across different platform, such as AWS, Kubernetes, VMs, etc., and through which end users request access to data and for data owners to manage the access request.

An Access Request for the data of interest at the storage system is generated S514. Referring to FIG. 1, whenever the user finds data of interest, the Data Discovery and Catalog Interface 140 generates an Access Request 144 that is provided to Data Access Layer 152 of Data Governance and Access Control Layer 150. A user is also able to provide input to generate Queries 191 at Data Query Interface 190. Through Queries 191, a user is able to create Views Over Existing Data 192 in Data Storage Layer 160. Queries 191 are also able to be provided for searching over multiple data stores in Data Storage Layer 160. Data Query Interface 190 forms a search input for Metadata and Data Definitions 193 from Data Discovery and Catalog Interface 140 to identify a dataset. Using the Metadata and Data Definitions 193, Data Query Interface 190 sends a read or write Access Request 194 to Policy Engine 182. Policy Engine 182 checks access rights. In response to Policy Engine 182 already having an approved Policy 184 related to the Access Request, the Access Request 194 is sent to the Data Storage Layer 160, The Data Storage Layer 160 is able to perform Access Verification 185 for the Access Request 194. Once the access rights are verified, the Data Storage Layer 160 returns the Response 195.

An Approval Request is automatically forwarded to one or more access control entities based on the Access Request S518. Referring to FIG. 1, data Discovery and Catalog Interface 140 provides the Access Request 144 to Data Access Layer 152 of Data Governance and Access Control Layer 150, where an Approval Request 153 is sent to a Data Owner 170 and a Data Governance Officer 172. Those skilled in the art understand that these are provided as examples and that other Data Approval Entities are able to be set up for granting approval to Approval Requests 153. The forwarding of the Approval Request 153 to a Data Approval Entities is able to be setup for automatic provisioning to the Data Approval Entities. For example, the Approval Request 153 is able to be provided to a Data Owner 170 via a communication channel, such as email. Once Data Access Layer 152 receives an Approval Response 154 from the Data Owner 170, Data Access Layer 152 sends an Approval Request 156 to Data Governance Officer 172 for a second level of approval. Data Access Layer 152 waits on Approval Response 157 from Data Governance Officer 172.

An Approval Response from the one or more access control entities is received S522. Referring to FIG. 1, once Data Access Layer 152 receives an Approval Response 154 from the Data Owner 170, Data Access Layer 152 sends an Approval Request 156 to Data Governance Officer 172 for a second level of approval. Data Access Layer 152 waits on Approval Response 157 from Data Governance Officer 172. The Data Access Layer 152 receives an Approval Response from the Data Governance Officers 172. Data Governance and Access Control Layer 150 enables Data Owners 170 or Data Governance Officers 172 to govern the data, including determining who can access the particular type of data for reads or writes, setting a time period for access, enabling access to the data or to particular columns based on predetermined restrictions, etc. Data Governance and Access Control Layer 150 also allows Data Owners 170 or Data Governance Officers 172 to edit or delete permissions.

A policy for accessing the data of interest at the storage system is created S526. Referring to FIG. 1, after the Approval Responses 154, 157 are received at the Data Access Layer 152, the Final Approval Response 158 is sent to the Policy Engine 180 at the Data Governance Layer 180 where a Policy 184 is created and applied for accessing the requested data at the Data Storage Layer 160.

Access to the data of interest at the storage system is provided based on the policy S530. Referring to FIG. 1, access to the requested data is then provided to the user according to the Policy 184.

Access verification is performed by the storage system for accessing the data of interest at the storage system based on the policy S534. Referring to FIG. 1, the Data Storage Layer 160 communicates with Policy Engine 182 to perform Access Verification 185. Data Governance and Access Control Layer 150 provides access control and auditing for MiniIO 161 and Yugabyte 162, as well as other storage technologies, such as MySQL 163, and Kafka 164.

Events are parsed and logs associated with access to the data of interest at the storage system are extracted S538. Referring to FIG. 4, MinIO Policy Engine 432 applies the New MinIO Policy 420 and Yugabyte Access Control 442 applies the New Yugabyte Policy 422. MinIO Event Notifications 434 of MinIO system 430 parses events and extracts MinIO Audit Events and Logs 450. Yugabyte Access Logs 444 parses Yugabyte Audit Logs 452.

The logs for auditing usage of the data of interest at the storage system are sent S542. Referring to FIG. 4, MinIO Audit Events and Logs 450 are sent to Auditing Interface 416 at the Data Governance Layer 410. Yugabyte Audit Logs 452 are sent to Auditing Interface 416 at the Data Governance Layer 410.

The usage of the data of interest at the storage system is audited based on a deterministic process S546. Referring to FIG. 4, auditing Interface 416 uses a deterministic approach to provide audit feedback. A deterministic approach identifies results based on a cause and the results do not vary unless the cause is modified. As shown in FIG. 4, different types of databases 430, 440 and different types of access logs 450, 452 are able to be provided. The deterministic approach provided by Auditing Interface 416 simplifies processing of access logs 450, 452, and how the user tracks the different databases 430, 440. While Auditing Interface 416 is described as using a deterministic approach, embodiments described here are able to be implemented in other ways, such as applying artificial intelligence (AI) and machine learning (ML) to generate audit results.

Input for creating a first level report is received for analyzing usage of data at the storage system S550. Referring to FIG. 1, Data Compute Interface 196 receives input for creating a First Level Reports for Analytics 197. After data access is given, a user is able to generate query input for accessing data, either using the query layer or from any user defined processes. The process then terminates S560.

At least one embodiment of the method provides central data governance and access control for enterprise data. The method includes receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

Figure 6:
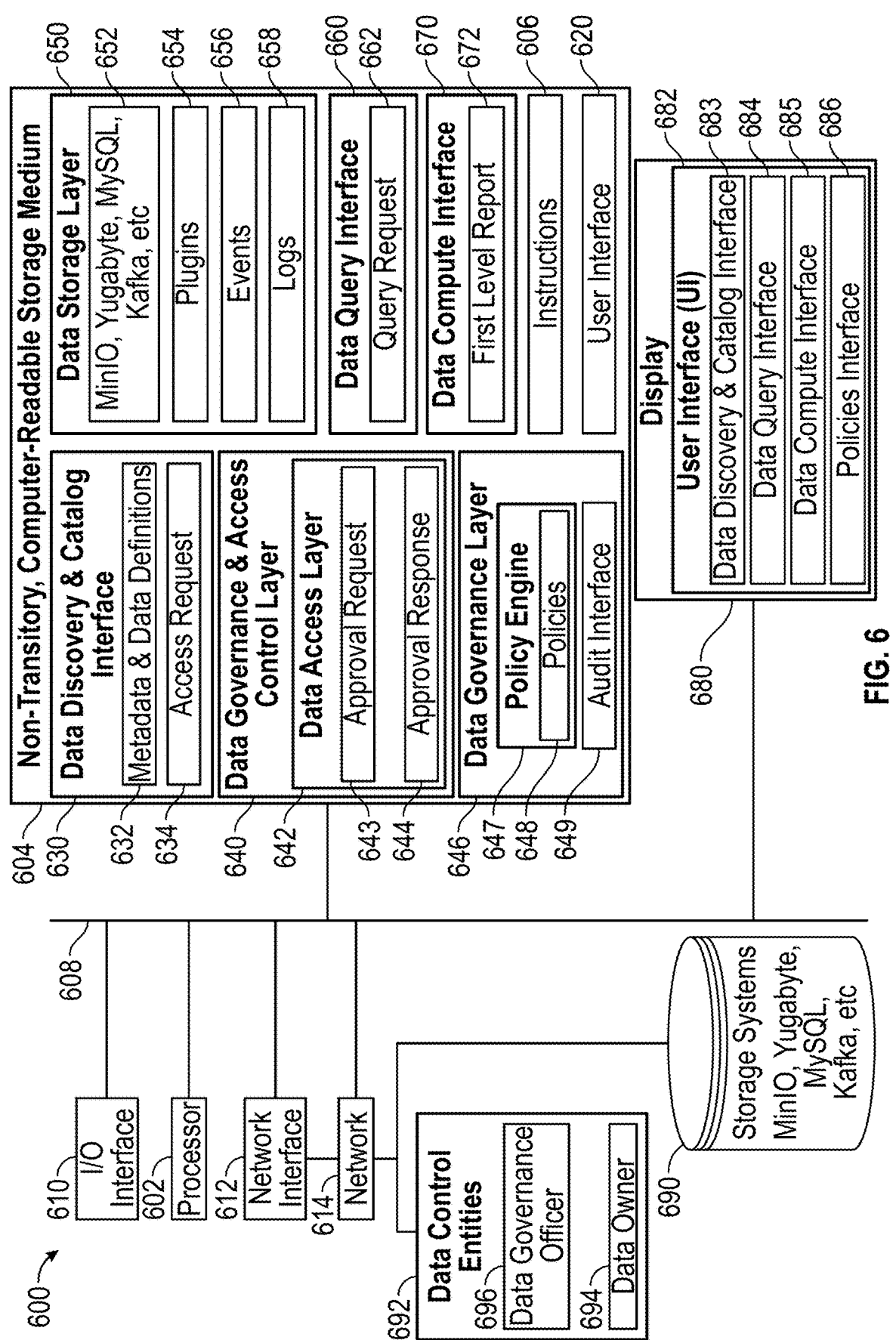
FIG. 6 is a high-level functional block diagram of a processor-based system according to at least one embodiment.

FIG. 6 is a high-level functional block diagram of a processor-based system 600 according to at least one embodiment.

In at least one embodiment, processing circuitry 600 provides central data governance and access control for enterprise data. Processing circuitry 600 implements central data governance and access control for enterprise data using Processor 602. Processing circuitry 600 also includes a Non-Transitory, Computer-Readable Storage Medium 604 that is used to implement central data governance and access control for enterprise data. Non-Transitory, Computer-Readable Storage Medium 604, amongst other things, is encoded with, i.e., stores, Instructions 606, i.e., computer program code, that are executed by Processor 602 causes Processor 602 to perform operations for providing central data governance and access control for enterprise data. Execution of Instructions 606 by Processor 602 represents (at least in part) an application which implements at least a portion of the methods described herein in accordance with one or more embodiments (hereinafter, the noted processes and/or methods).

Processor 602 is electrically coupled to Non-Transitory, Computer-Readable Storage Medium 604 via a Bus 608. Processor 602 is electrically coupled to an Input/Output (I/O) Interface 610 by Bus 608. A Network Interface 612 is also electrically connected to Processor 602 via Bus 608. Network Interface 612 is connected to a Network 614, so that Processor 602 and Non-Transitory, Computer-Readable Storage Medium 604 connect to external elements via Network 614. Processor 602 is configured to execute Instructions 606 encoded in Non-Transitory, Computer-Readable Storage Medium 604 to cause processing circuitry 600 to be usable for performing at least a portion of the processes and/or methods. In one or more embodiments, Processor 602 is a Central Processing Unit (CPU), a multiprocessor, a distributed processing system, an Application Specific Integrated Circuit (ASIC), and/or a suitable processing unit.

Processing circuitry 600 includes I/O Interface 610. I/O interface 610 is coupled to external circuitry. In one or more embodiments, I/O Interface 610 includes a keyboard, keypad, mouse, trackball, trackpad, touchscreen, and/or cursor direction keys for communicating information and commands to Processor 602.

Processing circuitry 600 also includes Network Interface 612 coupled to Processor 602. Network Interface 612 allows processing circuitry 600 to communicate with Network 614, to which one or more other computer systems are connected. Network Interface 612 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 600 is configured to receive information through I/O Interface 610. The information received through I/O Interface 610 includes one or more of instructions, data, design rules, libraries of cells, and/or other parameters for processing by Processor 602. The information is transferred to Processor 602 via Bus 608. Processing circuitry 600 is configured to receive information related to a User Interface (UI) through I/O Interface 610. The information is stored in Non-Transitory, Computer-Readable Storage Medium 604 as UI 620.

In one or more embodiments, one or more Non-Transitory, Computer-Readable Storage Medium 604 having stored thereon Instructions 606 (in compressed or uncompressed form) that may be used to program a computer, processor, or other electronic device) to perform processes or methods described herein. The one or more Non-Transitory, Computer-Readable Storage Medium 604 include one or more of an electronic storage medium, a magnetic storage medium, an optical storage medium, a quantum storage medium, or the like.

For example, the Non-Transitory, Computer-Readable Storage Medium 604 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 604 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 604 stores Instructions 606 configured to cause Processor 602 to perform at least a portion of the processes and/or methods for providing central data governance and access control for enterprise data. In one or more embodiments, Non-Transitory, Computer-Readable Storage Medium 604 also stores information, such as algorithm which facilitates performing at least a portion of the processes and/or methods for providing central data governance and access control for enterprise data.

Accordingly, in at least one embodiment, Processor 602 executes Instructions 606 stored on the one or more Non-Transitory, Computer-Readable Storage Medium 604 to implement a Data Discovery and Catalog Interface 630, a Data Governance and Access Control Layer 640, and a Data Storage Layer 650. Processor 602 executes Instructions 606 to implement a Data Access Layer 642 and a Data Governance Layer 646 at the Data Governance and Access Control Layer 640. Processor 602 executes Instructions 606 to implement a Policy Engine 647 and an Audit Interface 649 at the Data Governance Layer 646. Data Storage Layer 650 is able to support different storage technologies 652, such as MinIO, Yugabyte, MySQL, Kafka, etc. Plugins 654 are able to be added to support different storage technologies. Processor 602 executes Instructions 606 to implement a Data Query Interface 660 and a Data Compute Interface 670. Processor 602 executes Instructions 606 to receive information identifying data of interest at Storage Systems 690, generate an Access Request 634 for the data of interest at the Storage Systems 690, automatically forward an Approval Request 643 to one or more Access Control Entities 692, such as Data Owner 694 and Data Governance Officer 696 based on the Access Request 634, receive an Approval Response 644 from the one or more Access Control Entities 692, create Policies 648 for accessing the data of interest at the Storage Systems 690, and provide access to the data of interest at the Storage Systems 690 based on the Policies 648. Processor 602 executes Instructions 606 to provide access verification for accessing the data of interest at the Storage Systems 690 based on the Policies 648. Processor 602 executes Instructions 606 to receiving input at the Data Query Interface 660 for generating a Query Request 662, forming a search input for Metadata and Data Definitions 632 from a Data Discovery and Catalog Interface 630 to identify a dataset based on the input for generating the Query Request 662, generating the Query Request 662 to access the dataset at the Storage Systems 690 in response to the Metadata and Data Definitions 632, determining access rights at the Policy Engine 647 based on Policies 648, and accessing the dataset at the Storage Systems 690 granted according to the determined access rights of Policies 648 based on the Query Request 662. Processor 602 executes Instructions 606 to receive input at the Data Compute Interface 670 for creating a First Level Report 672 for analyzing usage of data at the Storage Systems 690. Processor 602 executes Instructions 606 to receive the Approval Response 644 at the Data Access Layer 642 from the one or more Access Control Entities 692 and determine, by the Policy Engine 647, one or more of users approved for access to the data of interest at the Storage Systems 690, a time period to set for allowing access to the data of interest, a scope of access to the Storage Systems 690, restrictions to access to the Storage Systems 690, or a mask to apply to the data. Processor 602 executes Instructions 606 to cause the Data Storage Layer 650 to parse Events 656 and extract Logs 658 associated with access to the data of interest at the Storage Systems 690, send the Logs 658 to the Audit Interface 649 for auditing usage of the data of interest at the Storage Systems 690 for auditing the usage of the data of interest at the Storage Systems 690 based on a deterministic process. A User Interface (UI) 682 is presented on a Display 680 to allow users to enter and manage data. For example, UI 682 is able to include a Data Discovery & Catalog Interface 683 for receiving user input to generate Access Requests 634. A Data Query Interface 684 allows a user to enter information for generating a Query Request 662. Data Compute Interface 685 allows a user to enter data to create a First Level Report 672 to enable analysis of the usage of data. Policies Interface 686 allows a user to configure Policies 648 for accessing data.

Embodiments described herein provide method that provides one or more advantages. For example, a method providing central data governance and access control for enterprise data provides a One-Stop solution for data governance and access related services. Time and effort is reduced for the end users because users do not have to create a ticket to get the access to particular data, and do not have to identify the data owner or data governance office for the particular data. Communication with the data owners and the data governance officers is handled automatically. Reliability and control are also provided through the centralized and optimized auditing.

An aspect of this description is directed to a method [1] for providing central data governance and access control for enterprise data includes receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

The method described in [1], further includes performing, by the storage system, access verification for accessing the data of interest at the storage system based on the policy.

The method described in [1] to [2], wherein the providing access to the data of interest at the storage system based on the policy includes providing access to the data of interest at one or more storage sources, wherein the one or more storage sources are accessible using one or more plugins.

The method described in [1] to [3], further includes receiving input for generating a Query, forming a search input for metadata and data definitions from a Data Discovery Catalog to identify a dataset based on the input for generating the Query, in response to the metadata and data definitions, generating a Query Request to access the dataset at the storage system, determining access rights based on the policy for accessing the dataset at the storage system, and based on the Query Request, accessing the dataset at the storage system granted according to the determined access rights.

The method described in [1] to [4], further includes receiving input for creating a first level report for analyzing usage of data at the storage system.

The method described in [1] to [5], wherein the receiving the Approval Response from the one or more access control entities includes determining one or more of users approved for access to the data of interest at the storage system, a time period to set for allowing access to the data of interest, a scope of access to the storage system, restrictions to access to the storage system, or a mask to apply to the data.

The method described in [1] to [6], further includes parsing events and extracting logs associated with access to the data of interest at the storage system, sending the logs for auditing usage of the data of interest at the storage system, and auditing the usage of the data of interest at the storage system based on a deterministic process.

An aspect of this description is directed to a data platform [8], including a memory storing computer-readable instructions, and a processor connected to the memory, wherein the processor is configured to execute the computer-readable instructions to perform operations to receive information identifying data of interest at a storage system, generate an Access Request for the data of interest at the storage system, automatically forward an Approval Request to one or more access control entities based on the Access Request, receive an Approval Response from the one or more access control entities, create a policy for accessing the data of interest at the storage system, and provide access to the data of interest at the storage system based on the policy.

The data platform described in [8], wherein the processor is further configured to perform access verification for accessing the data of interest at the storage system based on the policy.

The data platform described in [8] to [9], wherein the processor is further configured to provide access to the data of interest at the storage system based on the policy by providing access to the data of interest at one or more storage sources, wherein the one or more storage sources are accessible using one or more plugins.

The data platform described in [8] to [10], wherein the processor is further configured to receive input for generating a Query, form a search input for metadata and data definitions from a Data Discovery Catalog to identify a dataset based on the input for generating the Query, in response to the metadata and data definitions, generate a Query Request to access the dataset at the storage system, determine access rights based on the policy for accessing the dataset at the storage system, and based on the Query Request, access the dataset at the storage system granted according to the determined access rights.

The data platform described in [8] to [11], wherein the processor is further configured to perform operations to receive input for creating a first level report for analyzing usage of data at the storage system.

The data platform described in [8] to [12], wherein the processor is further configured to receive the Approval Response from the one or more access control entities by determining one or more of users approved for access to the data of interest at the storage system, a time period to set for allowing access to the data of interest, a scope of access to the storage system, restrictions to access to the storage system, or a mask to apply to the data.

The data platform described in [8] to [13], wherein the processor is further configured to parse events and extracting logs associated with access to the data of interest at the storage system, send the logs for auditing usage of the data of interest at the storage system, and audit the usage of the data of interest at the storage system based on a deterministic process.

An aspect of this description is directed to a non-transitory computer-readable media having computer-readable instructions stored thereon [15}, which when executed by a processor causes the processor to perform operations including receiving information identifying data of interest at a storage system provided by the data platform, generating an Access Request for the data of interest at the storage system, automatically forwarding an Approval Request to one or more access control entities based on the Access Request, receiving an Approval Response from the one or more access control entities, creating a policy for accessing the data of interest at the storage system, and providing access to the data of interest at the storage system based on the policy.

The non-transitory computer-readable media described in [15], further includes performing, by the storage system, access verification for accessing the data of interest at the storage system based on the policy.

The non-transitory computer-readable media described in to [16], wherein the providing access to the data of interest at the storage system based on the policy includes providing access to the data of interest at one or more storage sources, wherein the one or more storage sources are accessible using one or more plugins.

The non-transitory computer-readable media described in to [17], further including receiving input for generating a Query, forming a search input for metadata and data definitions from a Data Discovery Catalog to identify a dataset based on the input for generating the Query, in response to the metadata and data definitions, generating a Query Request to access the dataset at the storage system, determining access rights based on the policy for accessing the dataset at the storage system, and based on the Query Request, accessing the dataset at the storage system granted according to the determined access rights.

The non-transitory computer-readable media described in to [18], further includes receiving input for creating a first level report for analyzing usage of data at the storage system.

The non-transitory computer-readable media described in to [19], further including parsing events and extracting logs associated with access to the data of interest at the storage system, sending the logs for auditing usage of the data of interest at the storage system, and auditing the usage of the data of interest at the storage system based on a deterministic process. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing central data governance and access control for enterprise data, comprising:
   receiving information identifying data of interest at a storage system provided by a data platform;
   generating an access request for the data of interest at the storage system based on the received information;
   automatically forwarding an approval request to one or more access control entities based on the access request, wherein the one or more access control entities comprises at least one of a data owner, or a data governance officer;
   receiving an approval response from each of the one or more access control entities;
   creating a policy according to a database and a type of the data of interest at the storage system based on the approval response;
   applying the policy for accessing the database and the type of the data of interest at the storage system; and
   providing access to the data of interest at the storage system based on the policy.

2. The method of claim 1, further comprising:
   performing, by the storage system, access verification for accessing the data of interest at the storage system based on the policy.

3. The method of claim 1, wherein the providing the access to the data of interest at the storage system based on the policy includes providing the access to the data of interest at one or more storage sources, wherein the one or more storage sources are accessible using one or more plugins.

4. The method of claim 1, further comprising:
   receiving input for generating a Query;
   forming a search input for metadata and data definitions from a Data Discovery Catalog to identify a dataset based on the input for generating the query;
   in response to the metadata and data definitions, generating a query request to access the dataset at the storage system;
   determining access rights based on the policy for accessing the dataset at the storage system; and
   based on the query request, accessing the dataset at the storage system granted according to the determined access rights.

5. The method of claim 1, further comprising receiving input for creating a first level report for analyzing usage of data at the storage system.

6. The method of claim 1, wherein the receiving the approval response from the one or more access control entities includes determining one or more of users approved for the access to the data of interest at the storage system, a time period to set for allowing the access to the data of interest, a scope of the access to the storage system, restrictions to the access to the storage system, or a mask to apply to the data.

7. The method of claim 1, further comprising:

parsing events and extracting logs associated with access to events and logs by a data storage layer of the storage system;

sending the parsed events and extracted logs to the data storage layer of the storage system; and auditing the parsed events and extracted logs at the storage system based on a pre-defined deterministic process.

8. A data platform configured to:

receive information identifying data of interest at a storage system;

generate an access request for the data of interest at the storage system based on the received information;

automatically forward an approval request to one or more access control entities based on the access request, wherein the one or more access control entities comprises at least one of a data owner, or a data governance officer;

receive an approval response from the one or more access control entities;

create a policy according to a database and a type of the data of interest at the storage system based on the approval response;

apply the policy for accessing the database and the type of the data of interest at the storage system; and provide access to the data of interest at the storage system based on the policy.

9. The data platform of claim 8, further configured to perform operations to:

perform access verification for accessing the data of interest at the storage system based on the policy.

10. The data platform of claim 8, further configured to provide the access to the data of interest at the storage system based on the policy by providing the access to the data of interest at one or more storage sources, wherein the one or more storage sources are accessible using one or more plugins.

11. The data platform of claim 8, further configured to perform operations to:

receive input for generating a query;

form a search input for metadata and data definitions from a Data Discovery Catalog to identify a dataset based on the input for generating the query;

in response to the metadata and data definitions, generate a query request to access the dataset at the storage system;

determine access rights based on the policy for accessing the dataset at the storage system; and based on the query request, access the dataset at the storage system granted according to the determined access rights.

12. The data platform of claim 8, further configured to perform operations to receive input for creating a first level report for analyzing usage of data at the storage system.

13. The data platform of claim 8, further configured to receive the Approval Response from the one or more access control entities by determining one or more of users approved for the access to the data of interest at the storage system, a time period to set for allowing the access to the data of interest, a scope of the access to the storage system, restrictions to the access to the storage system, or a mask to apply to the data.

14. The data platform of claim 8, further configured to perform operations to:

parse events and extract logs associated with access to events and logs by a data storage layer of the storage system;

send the parsed events and extracted logs to the data storage layer of the storage system; and audit the parsed events and extracted logs at the storage system based on a pre-defined deterministic process.

15. A non-transitory computer-readable media having computer-readable instructions stored thereon, which when executed cause operations to be performed comprising:

receiving information identifying data of interest at a storage system provided by a data platform;

generating an access request for the data of interest at the storage system based on the received information;

automatically forwarding an approval request to one or more access control entities based on the access request, wherein the one or more access control entities comprises at least one of a data owner, or a data governance officer;

receiving an approval response from each of the one or more access control entities;

creating a policy according to a database and a type of the data of interest at the storage system based on the Approval Response approval response;

applying the policy for accessing the database and the type of the data of interest at the storage system; and providing access to the data of interest at the storage system based on the policy.

16. The non-transitory computer-readable media of claim 15, further comprising:

performing, by the storage system, access verification for accessing the data of interest at the storage system based on the policy.

17. The non-transitory computer-readable media of claim 15, wherein the providing the access to the data of interest at the storage system based on the policy includes providing the access to the data of interest at one or more storage sources, wherein the one or more storage sources are accessible using one or more plugins.

18. The non-transitory computer-readable media of claim 15, further comprising:

receiving input for generating a query;

forming a search input for metadata and data definitions from a Data Discovery Catalog to identify a dataset based on the input for generating the query;

in response to the metadata and data definitions, generating a query request to access the dataset at the storage system;

determining access rights based on the policy for accessing the dataset at the storage system; and based on the query request, accessing the dataset at the storage system granted according to the determined access rights.

19. The non-transitory computer-readable media of claim 15, further comprising receiving input for creating a first level report for analyzing usage of data at the storage system.

20. The non-transitory computer-readable media of claim 15, further comprising:

parsing events and extracting logs associated with access to events and logs by a data storage layer of the storage system;

sending the parsed events and extracted logs to the data storage layer of the storage system; and auditing the parsed events and extracted logs at the storage system based on a pre-defined deterministic process.

\* \* \* \* \*